United States Patent
Lu et al.

(10) Patent No.: US 12,066,801 B2
(45) Date of Patent: Aug. 20, 2024

(54) SPOILING APPARATUS FOR TRIGGERING TURBULENT TRANSITION BY AUTONOMOUS DISTURBANCE AND SPOILERS

(71) Applicant: CHINA ACADEMY OF LAUNCH VEHICLE TECHNOLOGY, Beijing (CN)

(72) Inventors: Hongzhi Lu, Beijing (CN); Jing Zhao, Beijing (CN); Lili Liu, Beijing (CN); Junpeng Hui, Beijing (CN); Minhua Liu, Beijing (CN); Min Zhao, Beijing (CN); Leijing Kang, Beijing (CN); Yue Zhao, Beijing (CN); Yifan Li, Beijing (CN)

(73) Assignee: CHINA ACADEMY OF LAUNCH VEHICLE TECHNOLOGY, Beijing (CN)

( * ) Notice: Subject to any disclaimer, the term of this patent is extended or adjusted under 35 U.S.C. 154(b) by 728 days.

(21) Appl. No.: 17/261,535

(22) PCT Filed: Nov. 2, 2018

(86) PCT No.: PCT/CN2018/113737
§ 371 (c)(1),
(2) Date: Jan. 19, 2021

(87) PCT Pub. No.: WO2020/042351
PCT Pub. Date: Mar. 5, 2020

(65) Prior Publication Data
US 2021/0294285 A1    Sep. 23, 2021

(30) Foreign Application Priority Data

Aug. 31, 2018 (CN) .................. 201811007947.X (51) Int. Cl.
G05B 17/02 (2006.01)
B63B 1/32 (2006.01)
B64C 5/10 (2006.01)

(52) U.S. Cl.
CPC .............. G05B 17/02 (2013.01); B63B 1/322 (2013.01); B64C 5/10 (2013.01)

(58) Field of Classification Search
None
See application file for complete search history.

(56) References Cited

U.S. PATENT DOCUMENTS

2002/0160669 A1* 10/2002 Spade ..................... B63H 11/11
440/43
2010/0266382 A1 10/2010 Campe et al.

FOREIGN PATENT DOCUMENTS

CN     102501942 A     6/2012
CN     102758728 A     10/2012
(Continued)

OTHER PUBLICATIONS

Abbena et al., "Modern Differential Geometry of Curves and Surfaces with Mathematica", 2017, CRC Press, pp. 53-59 (Year: 2017).*

(Continued)

*Primary Examiner* — Tamara L Weber
(74) *Attorney, Agent, or Firm* — Harness, Dickey & Pierce, P.L.C.

(57) ABSTRACT

A spoiling apparatus for triggering a turbulent transition by autonomous disturbance and spoilers. The spoilers are mounted in multiple grooves in the circumferential direction of a navigating body, when a flow autonomously undergoes a turbulent transition, the spoilers remain in the grooves, the surface of the navigating body is free of protrusion, thus causing no additional flow resistance. A rated critical Reynolds number is set, in a case of a reduced flow speed and (Continued)

reduced density, the flow is a laminar flow, at which time the pressure applied to the spoilers by the flow is reduced, and the spoilers are ejected under the effect of compression springs. When ejected, the spoilers disturb the flowing of the bottom layer of the flow, and trigger the laminar flow into a turbulent flow. By setting the rebounding force of the compression springs, the spoiling apparatus is turned on automatically when a disturbance-triggered turbulent transition is required and is turned off when not required, thus implementing the autonomous control of turbulent transitions.

17 Claims, 5 Drawing Sheets

(56) References Cited

FOREIGN PATENT DOCUMENTS

| | | | |
|---|---|---|---|
| CN | 103204186 A | 7/2013 | |
| CN | 104260823 A | 1/2015 | |
| CN | 106542046 A | 3/2017 | |
| CN | 107600354 A | 1/2018 | |
| JP | 5669114 B2 * | 2/2015 | ............... B63B 1/38 |

OTHER PUBLICATIONS

International Search Report (English and Chinese) and Written Opinion (Chinese) of the International Searching Authority issued in PCT/CN2018/113737, mailed Apr. 28, 2019; ISA/CN.

* cited by examiner

SPOILING APPARATUS FOR TRIGGERING TURBULENT TRANSITION BY AUTONOMOUS DISTURBANCE AND SPOILERS

The application is the US national phase of International application No. PCT/CN2018/113737, titled "SPOILING APPARATUS FOR TRIGGERING TURBULENT TRANSITION BY AUTONOMOUS DISTURBANCE AND SPOILERS" filed on Nov. 2, 2018, which claims the priority to Chinese Patent Application No. 201811007947.X, titled "SPOILING APPARATUS FOR TRIGGERING TURBULENT TRANSITION BY AUTONOMOUS DISTURBANCE AND SPOILERS", filed on Aug. 31, 2018, with the China National Intellectual Property Administration, both of which are incorporated herein by reference in their entirety.

TECHNICAL FIELD

The present disclosure relates to a spoiler apparatus for triggering turbulence transition to by autonomous disturbance, and a spoiler thereof, which pertains to the technical field of vehicle resistance control.

BACKGROUND

A vehicle needs to overcome resistance when navigating in the air and underwater. The resistance against the vehicle mainly includes frictional resistance on a surface of the vehicle and pressure drag. For a vehicle at a low speed, the pressure drag accounts for most of the resistance, and is mainly caused by a flow of a vortex shedding at bottom of the vehicle. Due to the shedding vortex, pressure at the bottom of the vehicle cannot rise back to an ambient pressure, resulting in a large pressure drag. Moreover, the vehicle is subject to unnecessary vibration forces due to periodic large-scale fluctuation of the pressure at the bottom of the vehicle.

In order to reduce the pressure drag, it is required to effectively eliminate the vortex shedding at the bottom of the vehicle. The main cause of the vortex shedding at the bottom of the vehicle is that surface layer energy of the flow is too low to resist strong adverse pressure gradient caused by a deflection of the flow at the bottom, thereby resulting in a local flow separation and generating a vortex flow. Therefore, the solution for eliminating the vortex shedding at the bottom to reduce the pressure drag is to improve, upstream of the bottom, a flow of a surface layer on the surface of the vehicle to trigger a flow state transition from laminar to turbulent, thereby enhancing the energy of the flow at the surface layer and avoiding the vortex shedding generated at the bottom.

However, additional resistance is usually generated in triggering the flow state transition from laminar to turbulent. Therefore, the problem to be solved in engineering design is to find a solution with which the transition from laminar to turbulent can be effectively triggered without generating additional resistance, the surface layer energy can be increased and the vortex shedding at the bottom can be eliminated, thereby reducing the resistance against the vehicle.

SUMMARY

An object of the present disclosure is to reduce the resistance against the vehicle and improve overall performance by providing a spoiler apparatus for triggering turbulence transition by autonomous disturbance, and a spoiler, which can generate a large circumferential disturbance with small structural changes and effectively trigger turbulence transition.

The object of the present disclosure is achieved by the following technical solutions.

A spoiler apparatus for triggering turbulence transition by autonomous disturbance is provided, which includes a groove, a spoiler, and an elastic member, where the groove is provided upstream of a bottom surface of a vehicle, the spoiler is provided in the groove, one end of the spoiler is fixed in the groove via a swing shaft, and another end of the spoiler is connected to a bottom of the groove via the elastic member and is rotatable about the swing shaft, and an outward pushing force on the spoiler generated by the elastic member in a maximally compressed state is balanced with a pressure in a critical state of flow.

Preferably, the spoiler is configured as a flow-guiding plane structure having a continuously increasing curvature, where an upstream portion of the spoiler is parallel to a flow incoming direction, and a downstream portion of the spoiler is parallel to a circumferential direction.

Preferably, an inner side surface curve, an outer side surface curve, or a center curve of the spoiler is determined by:

(1) establishing a dimensionless equation:

$$y = x^n(1-x)(1+n-nx)+x$$

(2) selecting a value for n from 0.3 to 0.7, (3) obtaining a horizontal length X0 and a vertical height Y0 of the inner side surface curve, the outer side surface curve, or the center curve of the spoiler, and (4) calculating coordinates (X, Y) of the inner side surface curve, the outer side surface curve, or the center curve as follows:

$$X = x \cdot X0$$

$$Y = y \cdot Y0$$

Preferably, a limiting structure is provided at one end of the spoiler to limit a maximum opening angle and a minimum compressed height of the spoiler.

Preferably, multiple dovetail grooves are provided in parallel to each other on a surface of the spoiler.

Preferably, a centerline of each of the multiple dovetail grooves is determined by:

(1) establishing a dimensionless equation:

$$y = x^n(1-x)(1+n-nx)+x$$

(2) selecting a value for n from 0.3 to 0.7, (3) obtaining a horizontal length X1 and a vertical height Y1 of an outline curve of each of the multiple dovetail grooves, and (4) calculating coordinates (X, Y) of an inner side surface curve, an outer side surface curve, or a center curve as follows:

$$X = x \cdot X1$$

$$Y = y \cdot Y1.$$

Preferably, an opening width of each of the multiple dovetail grooves is not less than 2 mm, an opening angle of each of the multiple dovetail grooves ranges from 60 to 90 degrees, and an opening depth of each of the multiple dovetail grooves is 0.5 to 1.0 times the opening width.

Preferably, multiple protrusions are provided on the surface of the spoiler at equal distance along the flow incoming direction, where two ends of each of the multiple protrusions are larger than the middle of the protrusion, widths of the two ends are 0.1 to 0.2 times an inter-protrusion distance, two side surfaces of each of the multiple protrusions each have a shape of circular arc having a central angle ranging from 30 to 60 degrees, and the inter-protrusion distance is 0.5 to 2.0 times a width of the spoiler.

Preferably, an outer surface of each of the multiple protrusions has a shape of circular arc, and a central angle of the circular arc ranges from 60 to 90 degrees.

Preferably, multiple randomly-sized side-edge saw teeth are formed on an inner side surface of the spoiler.

Preferably, 5 to 50 grooves are evenly provided on the vehicle in the circumferential direction.

Preferably, the spoiler covers no more than half of a circumferential length of the vehicle.

A spoiler is further provided, which is configured as a flow-guiding plane structure having a continuously increasing curvature, where an upstream portion of the spoiler is parallel to a flow incoming direction, and a downstream portion of the spoiler is parallel to a circumferential direction.

Preferably, an inner side surface curve, an outer side surface curve, or a center curve of the spoiler is determined by:
(1) establishing a dimensionless equation:

$$y = x^n(1-x)(1+n-nx)+x$$

(2) selecting a value for n from 0.3 to 0.7,
(3) obtaining a horizontal length X0 and a vertical height Y0 of the inner side surface curve, the outer side surface curve, or the center curve of the spoiler, and
(4) calculating coordinates (X, Y) of the inner side surface curve, the outer side surface curve, or the center curve as follows:

$$X = x \cdot X0$$

$$Y = y \cdot Y0$$

Preferably, a limiting structure is provided at one end of the spoiler to limit a maximum opening angle and a minimum compressed height of the spoiler.

Preferably, multiple dovetail grooves are provided in parallel to each other on a surface of the spoiler.

Preferably, an outline curve of each of the multiple dovetail grooves is determined by:
(1) establishing a dimensionless equation:

$$y = x^n(1-x)(1+n-nx)+x$$

(2) selecting a value for n from 0.3 to 0.7,
(3) obtaining a horizontal length X1 and a vertical height Y1 of the outline curve of each of the multiple dovetail grooves, and
(4) calculating coordinates (X, Y) of an inner side surface curve, an outer side surface curve, or a center curve as follows:

$$X = x \cdot X1$$

$$Y = y \cdot Y1.$$

Preferably, an opening width of each of the multiple dovetail grooves is not less than 2 mm, an opening angle of each of the multiple dovetail grooves ranges from 60 to 90 degrees, and an opening depth of each of the multiple dovetail grooves is 0.5 to 1.0 times the opening width.

Preferably, multiple protrusions are provided on the surface of the spoiler at equal distance along the flow incoming direction, where two ends of each of the multiple protrusions are larger than the middle of the protrusion, widths of the two ends are 0.1 to 0.2 times an inter-protrusion distance, two side surfaces of each of the multiple protrusions each have a shape of circular arc having a central angle ranging from 30 to 60 degrees, and the inter-protrusion distance is 0.5 to 2.0 times a width of the spoiler.

Preferably, an outer surface of each of the multiple protrusions has a shape of circular arc, and a central angle of the circular arc ranges from 60 to 90 degrees.

Preferably, multiple randomly-sized side-edge saw teeth are formed on an inner side surface of the spoiler.

Compared with the conventional technology, the present disclosure has the following advantages.

(1) In the apparatus for triggering turbulence transition according to the present disclosure, a spoiler is arranged in each of multiple grooves on the vehicle along a circumferential direction. If transition to turbulence occurs autonomously, the spoiler is kept within a respective one of the multiple grooves and there is no protrusion on the surface of the vehicle, thus no additional flow resistance is generated. A rated critical Reynolds number is set according to the present disclosure. In a case that a flow velocity decreases and a density is low, the flow is laminar, pressure on the spoiler by the flow decreases and the spoiler is sprung out by force of a compressive spring. The sprung spoiler disturbs the flow at bottom, triggering a transition from laminar to turbulent. According to the present disclosure, by setting elastic force of the spring, the spoiler apparatus can be automatically turned on in need of triggering the turbulence, and can be automatically turned off if there is no such need, realizing autonomous control of turbulence transition.

(2) According to the present disclosure, two limiting surfaces are provided at one end of the spoiler. Thus an angle at which the spoiler is opened after being sprung out by the compressive spring is not larger than a maximum opening angle. In a case that the spoiler is closed within the groove, a limiting side surface prevents the spoiler from being pressed down. The limiting surfaces are two planes arranged at one end of the spoiler, having a simple structure and easy implementation.

(3) According to the present disclosure, the critical Reynolds number based on which the spoiler is sprung out can be changed by adjusting the force of the compressive spring, so that the spoiler apparatus can be widely applied in different navigating states and widely used in multiple air and underwater scenarios.

(4) According to the disclosure, the spoiler is sickle-shaped, guiding the flow to a circumferential flow. The circumferential facilitates disturbing the flow at the bottom of the vehicle to trigger transition from laminar to turbulent, thereby reducing the resistance at the bottom.

(5) According to the disclosure, an outline curve of the spoiler is configured as a high-order continuous curve, having continuity of second order or above second order. With the continuous curve, flow separation generated by the spoiler can be effectively reduced, thereby reducing frictional resistance brought by the spoiler itself.

(6) According to the present disclosure, an equation of the higher-order continuous curve is provided. It is only required to determine a horizontal length and a vertical height of the curve to obtain coordinates of the curve. By configuring different values for index n in the equation, a smoother or steeper curve change can be obtained. Therefore, it is only required to optimize the single parameter n when performing optimization on the curve according to different design requirements, simplifying the optimization design.

(7) According to the present disclosure, dovetail grooves are provided on the surface of the spoiler in the flow direction. The dovetail groove is configured by the same high-order continuous curve as the spoiler to guide the flow from an axial direction to the circumferential direction. The dovetail groove on the surface of the spoiler has a certain depth and a certain angle to introduce a low-speed flow on a surface layer of the surface of the vehicle into the dovetail groove, reducing additional frictional resistance caused by flow mixing.

(8) According to the present disclosure, side-edge saw teeth can be optionally provided on the side surface of the spoiler. The side-edge saw teeth can be used in combination with waistdrum-shaped protrusions on an upper surface of the spoiler or with the dovetail grooves on the upper surface of the spoiler. The side-edge saw teeth having random sizes can generate multi-scale turbulences, inducing vortices having different sizes, thereby effectively triggering the transition to turbulence.

(9) Waistdrum-shaped protrusions can be optionally provided on the upper surface of the spoiler. The protrusions at two ends of the spoiler, while generating normal vortex, push the flow from the two ends of the spoiler to the middle of the spoiler to be mixed with the normal vortex, generating a three-dimensional vortex structure and further facilitating accelerating the development of flow into turbulence.

BRIEF DESCRIPTION OF THE DRAWINGS

FIG. 8(*a*) is a partial top view of waistdrum-shaped protrusions on a spoiler;

FIG. 8(*b*) is a sectional view along line A-A in FIG. 8(*a*); and

FIG. 8(*c*) is a sectional view along line B-B in FIG. 8(*a*).

DETAILED DESCRIPTION OF THE EMBODIMENTS

In order to reduce resistance against a vehicle, turbulence transition is triggered upstream of a bottom of the vehicle to increase flow energy of a surface layer and eliminate vortex shedding at the bottom, thereby reducing the resistance at the bottom. Moreover, it is required to effectively trigger the transition to turbulence with little additional resistance.

Therefore, it is proposed to install a spoiler which can be automatically sprung out upstream of the bottom. By using predetermined compression force of a spring, the spoiler can be automatically sprung out from a groove in a case that flow speed is low, and then the spoiler disturbs the flow to trigger a flow state transition from laminar to turbulent. In order to achieve a large disturbance with little additional resistance, a shape of the spoiler is configured as a high-order smooth curve, guiding the flow from an axial direction to a circumferential direction to generate circumferential disturbance, thereby triggering the transition more effectively. Furthermore, dovetail grooves are provided on the surface of the spoiler to reduce flow resistance against the spoiler. Alternatively, randomly distributed saw teeth are provided on a side edge of the spoiler, or waistdrum-shaped protrusions are provided on the surface of the spoiler, thereby realizing the disturbance of the flow with little additional resistance.

Figure 1:
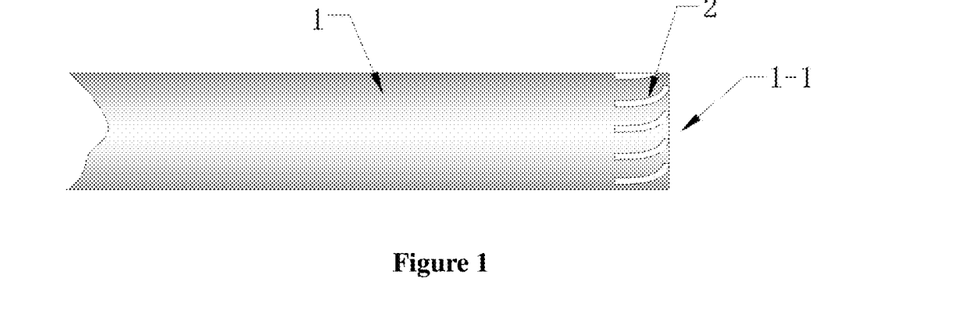
FIG. 1 is a schematic structural diagram of a groove according to the present disclosure.

Referring to FIG. 1, a spoiler apparatus for triggering turbulence transition by autonomously disturbing a flow at bottom includes a groove 2, a spoiler 3, and a compressive spring. The groove is provided upstream of a bottom surface 1-1 of a vehicle 1. The spoiler 3 is provided in the groove. One end of the spoiler is fixed in the groove via a swing shaft, and another end of the spoiler is connected to a bottom of the groove via the compressive spring and is rotatable about the swing shaft. A limiting device is provided for limiting a rotation angle of the one end of the spoiler to limit a maximum opening angle of the spoiler to 10 degrees. 5 to 50 grooves are evenly distributed on the vehicle in a circumferential direction. A size of the groove is slightly larger than a size of the spoiler.

The spoiler 3 is a sheet-like structure having a constant width and a continuously increasing curvature, which is sickle-shaped. A head portion of the spoiler 3 is parallel to a flow incoming direction, and a tail portion of the spoiler 3 is parallel to the circumferential direction, thereby guiding an incoming flow to the circumferential direction. A width of the spoiler 1% to 10% of a circumference of the vehicle, and the spoiler covers no more than half of the circumference of the vehicle.

In order to reduce resistance in guiding the flow to the circumferential direction, a high-order continuous curve is required for an outline of the spoiler. In an embodiment, an outline curve (an inner side surface curve, an outer side surface curve, or a center curve) of the spoiler is configured as a high-order continuous curve. A dimensionless equation of the higher-order continuous curve is given as follows:

$$y = x^n(1-x)(1+n-nx)+x \tag{1}$$

Figure 5:
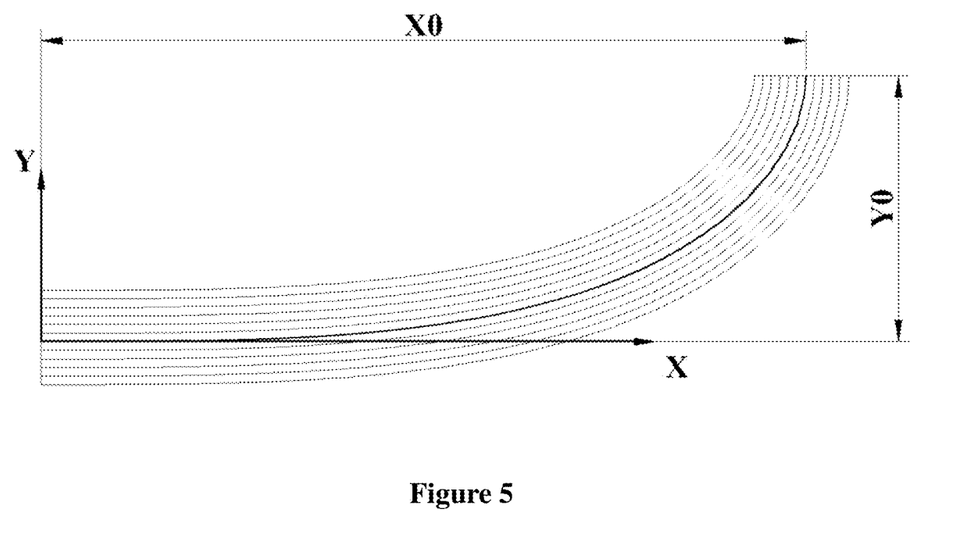
FIG. 5 is a schematic diagram of definition of shape curves of a spoiler and dovetail grooves.

In equation (1), a typical value of n is 0.5, and a recommended range of n is 0.3 to 0.7. x ranges from 0 to 1. After obtaining y, based on a horizontal length X0 and a vertical height Y0 of each curve according to the design requirement, coordinates X and Y of an actual curve are obtained by using equations (2) and (3), as shown in FIG. 5, where the spoiler is shaped on the coordinate data.

$$X = x \cdot X0 \tag{2}$$

$$Y = y \cdot Y0 \tag{3}$$

Figure 4:
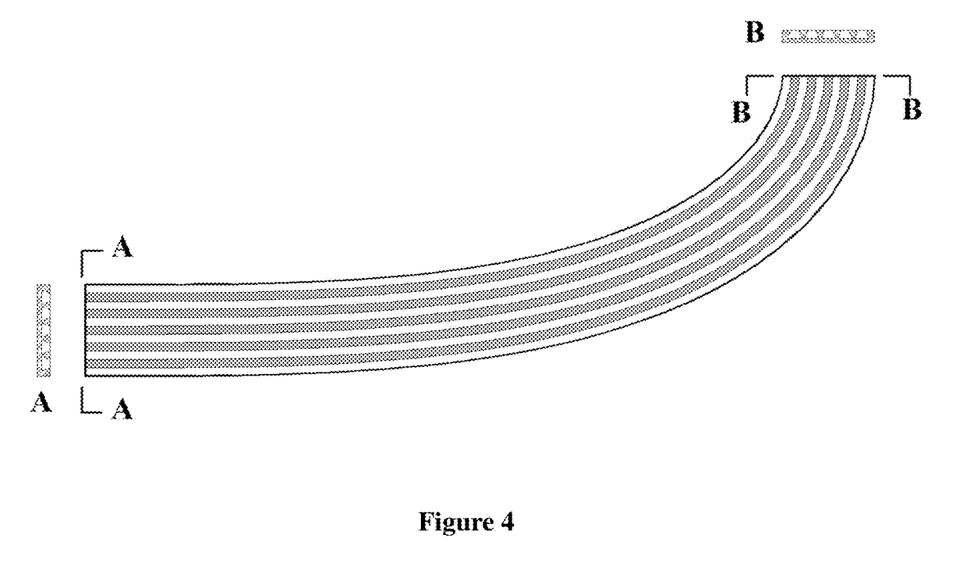
FIG. 4 is a top view of a spoiler and dovetail grooves on an upper surface of the spoiler according to the present disclosure.

A spoiler structure is provided on the surface of the spoiler. In one embodiment, multiple dovetail grooves 3-3 may be provided in parallel to each other on the surface of the spoiler to form the spoiler structure as shown in FIG. 4. Three or more parallel dovetail grooves having same width are formed on the surface of the spoiler.

The outline curve of the spoiler is configured as a high-order continuous curve. An outline curve of the dovetail groove is obtained based on the same curve equations (1), (2), and (3) and a same calculation algorithm as the outline curve of the spoiler.

Figure 6:
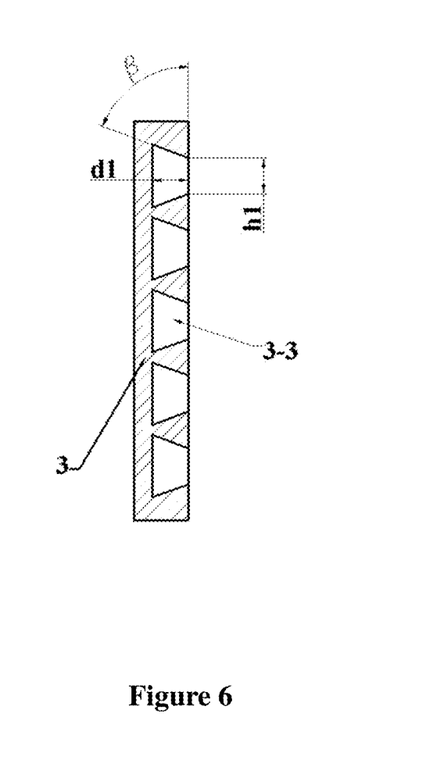
FIG. 6 is a side view of dovetail grooves on a spoiler.

An opening width h1 of the dovetail groove is usually not less than 2 mm, an opening angle β of the dovetail groove ranges from 60 to 90 degrees, and an opening depth d1 of the dovetail groove is 0.5 to 1.0 times the opening width.

Figure 2:
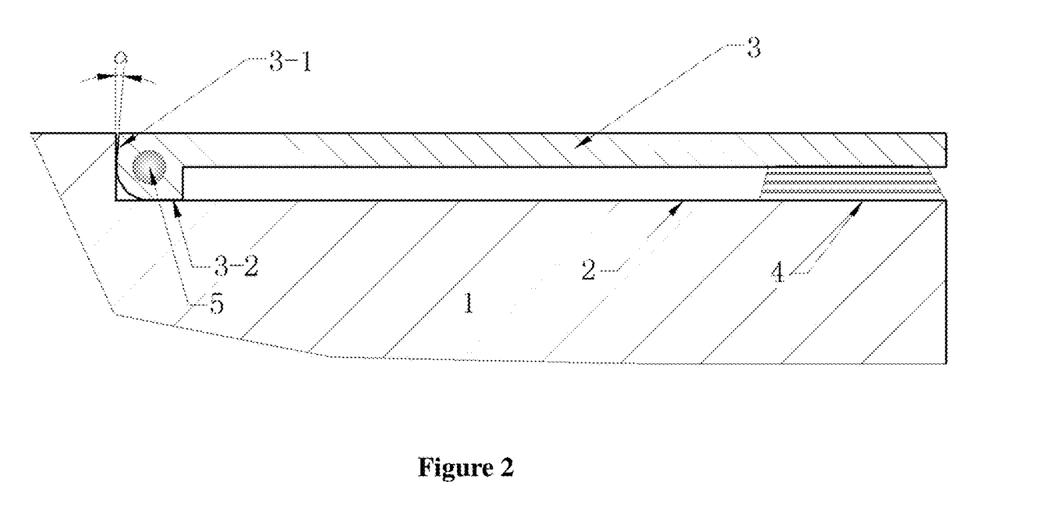
FIG. 2 is a schematic diagram of a spoiler closed within a groove according to the present disclosure.

FIG. 2 shows a state of a spoiler closed within a groove. One end of the spoiler is connected to the groove of the vehicle via a spoiler swing shaft 5, and another end of the spoiler is restricted within the groove by the compressive spring 4.

In a case that a flow velocity of a fluid and a density of the fluid are high, a force exerted by the fluid is greater than a restoring force of the compressive spring 4, thereby restricting the spoiler 3 within the groove 2. In this case, the spoiler 3 is closed within the groove 2, the flow is in a turbulent state, and it is not required to spring up the spoiler 3. A lower limiting side surface 3-2 of the spoiler prevents the spoiler from being pressed too low by the flow.

Figure 3:
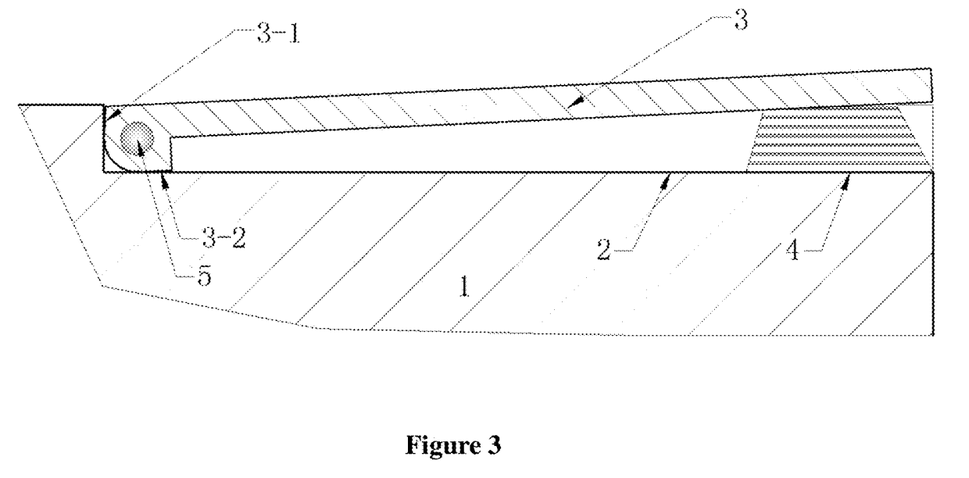
FIG. 3 is a schematic diagram of a spoiler sprung out by a compressive spring according to the present disclosure.

FIG. 3 shows a state of the spoiler 3 opened from the groove 2. One end of the spoiler 3 is connected to the groove 2 of the vehicle 1 via the spoiler swing shaft 5, and another end of the spoiler 3 is sprung out by the compressive spring 4.

In a case that the flow velocity of the fluid and the density of the fluid are low, pressure of the fluid on the spoiler 3 is reduced. If the force exerted by the fluid is less than an elastic force of the compressive spring 4, the compressive spring 4 springs the spoiler 3 out from the groove. An upper limiting side surface 3-1 of the spoiler 3 prevents the spoiler from being sprung too much, ensuring that an opening angle of the spoiler is not larger than a maximum opening angle α. The upper limiting side surface 3-1 is provided with a protruding limiting portion, to prevent the spoiler from rotating beyond a set angle.

When the compressive spring 4 is compressed to an uttermost bottom, the elastic force generated by the compressive spring 4 is balanced with a pressure in a critical state of flow.

The critical state of flow is defined as follows. Reynolds number being 1E5 (the vehicle is navigating in water) or 1E6 (the vehicle is navigating in the air) is the critical state for transition to turbulence. If the Reynolds number is greater than the critical state Reynolds number, transition to turbulence will occur autonomously. If the Reynolds number is less than the critical state Reynolds number and the flow is not subjected to external disturbance, the transition to turbulence will not occur. If the Reynolds number is less than the critical state Reynolds number, a pressure of the flow is less than the elastic force of the compressive spring, the spoiler is sprung out by the compressive spring, disturbing the flow and triggering the transition to turbulence. If the Reynolds number is greater than the critical state Reynolds number, the pressure of the flow is greater than the elastic force of the compressive spring, the spoiler is kept within the groove, and the transition to turbulence occurs autonomously.

Figure 7:
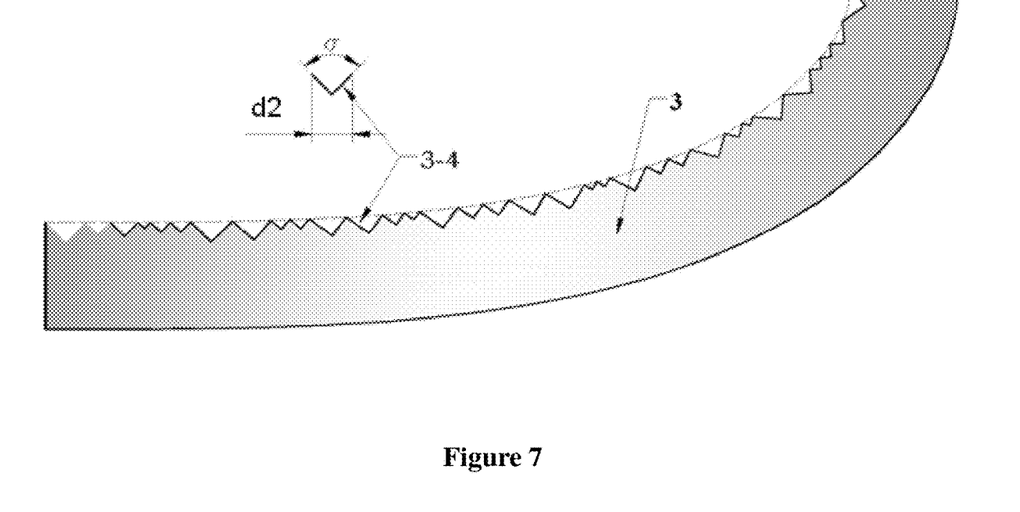
FIG. 7 is a top view of a spoiler and side-edge saw teeth.

After being sprung, the spoiler protrudes from a surface layer of the flow. Due to the fact that the spoiler has a sickle-shaped outline and multiple parallel dovetail grooves are arranged on the surface of the spoiler, the spoiler disturbs the flow to generate a small vortex flow, part of the axial flow in the surface layer is guided to a circumferential direction to more effectively disturb the flow, trigger turbulence at the bottom of the vehicle and reduce the vortex shedding at the bottom of the vehicle, thereby reducing the resistance at the bottom. In an embodiment, side-edge saw teeth are formed on an inner side surface of the spoiler as shown in FIG. 7. Along the inner side surface of the sickle-shaped spoiler, multiple randomly-sized side-edge saw teeth 3-4 are arranged, which can generate multi-scale disturbances, trigger multi-scale vortices and effectively trigger turbulence. An angle σ of the side-edge saw teeth ranges from 60 to 90 degrees. A width d2 of the side-edge saw teeth is related a thickness of a local surface layer, which ranges from 3 to 20 mm. Within this range, sizes of the side-edge saw teeth are determined based on a discrete random probability distribution. An upper surface may be configured with the dovetail groove structure shown in FIG. 4 or the protrusions 6 shown in FIG. 8.

Figure 8:
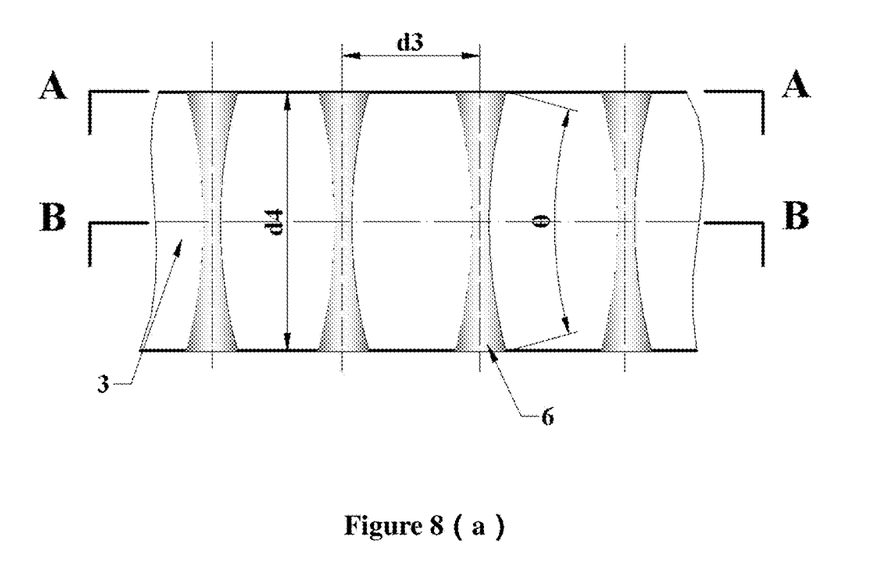

In another embodiment, waistdrum-shaped protrusions 6 may be formed on the upper surface of the spoiler as shown in FIG. 8. Two ends of each of the waistdrum-shaped protrusion are large, thereby pushing the flow from the two ends the middle. Thus, a normal flow is mixed with a normal vortex, facilitating generating a three-dimensional vortex structure and accelerating the development of flow into turbulence. The protrusions are evenly arranged on the surface of the spoiler. The waistdrum-shaped protrusions are used to disturb the flow in a bottom layer. Two ends of the protrusion push the flow from the two ends to a centerline of the spoiler to be mixed with the normal vortex generated by the whole waistdrum-shaped protrusion, generating the three-dimensional vortex structure.

An inter-protrusion distance d3 between the waistdrum-shaped protrusions 6 (distance between centerlines of two protrusions) is 0.5 to 2.0 times the width of the spoiler. The waistdrum-shaped protrusions 6 are have a larger size at two ends and a smaller size in the middle. An outer contour curve of the waistdrum-shaped protrusion has a shape of circular arc, a width d4 of the waistdrum-shaped protrusion is equal to the width of the spoiler and a central angle θ ranges from 30 to 60 degrees.

Referring to FIG. 8(b), a size of the waistdrum-shaped protrusion is determined by an end width and a central angle. The end width d5 is 0.1 to 0.2 times the inter-protrusion distance d3. The central angle @ of the circular arc ranges from 60 to 90 degrees. A surface of the waistdrum-shaped protrusion has a shape of circular arc.

Side-edge saw teeth on the spoiler can be used in combination with the waistdrum-shaped protrusions on the upper surface of the spoiler or with the dovetail grooves on the upper surface of the spoiler. The side-edge saw teeth are formed on the side surface of the spoiler, and the waistdrum-shaped protrusions are formed on the upper surface of the spoiler. Or, the side-edge saw teeth are formed on the side surface of the spoiler, and the dovetail grooves are formed on the upper surface of the spoiler.

The apparatus is applied in the vehicle to autonomously trigger the transition to turbulence, thereby reducing the resistance at the bottom, and providing a basis for reduction of resistance by the vehicle autonomously.

The above described are only some preferred embodiments of the present invention and the protection scope of the present disclosure is not limited to the above embodiments. Any modifications or replacements that can be easily conceived by those skilled in the art within the technical scope of the present disclosure should fall within the protection scope of the present disclosure.

Content in the present disclosure not described in detail belongs to common practice of those skilled in the art.

The invention claimed is:

1. A spoiler apparatus for triggering turbulence transition by autonomous disturbance, the apparatus comprising a groove, a spoiler, and an elastic member, wherein:
   the groove is provided upstream of a bottom surface of a vehicle,
   the spoiler is provided in the groove, and one end of the spoiler is fixed in the groove via a swing shaft, and another end of the spoiler is connected to a bottom of the groove via the elastic member and is rotatable about the swing shaft, and
   an outward pushing force on the spoiler generated by the elastic member in a maximally compressed state is balanced with a pressure in a critical state of flow;
   wherein the spoiler is configured as a flow-guiding plane structure having a continuously increasing curvature, an upstream portion of the spoiler is parallel to a flow incoming direction, and a downstream portion of the spoiler is parallel to a circumferential direction; and
   wherein a plurality of dovetail grooves is arranged in parallel to each other on a surface of the spoiler.

2. The spoiler apparatus for triggering turbulence transition by autonomous disturbance according to claim 1, wherein an inner side surface curve, an outer side surface curve, or a center curve of the spoiler is determined by:
   (1) establishing a dimensionless equation:

$y = x^n(1-x)(1+n-nx)+x$ (2) selecting a value for n from 0.3 to 0.7,
   (3) obtaining a horizontal length X0 and a vertical height Y0 of the inner side surface curve, the outer side surface curve, or the center curve of the spoiler, and
   (4) calculating coordinates (X, Y) of the inner side surface curve, the outer side surface curve, or the center curve as follows:

$X = x \cdot X0$, $Y = y \cdot Y0$,

3. The spoiler apparatus for triggering turbulence transition by autonomous disturbance according to claim 1, wherein a limiting structure is provided at one end of the spoiler to limit a maximum opening angle and a minimum compressed height of the spoiler.

4. The spoiler apparatus for triggering turbulence transition by autonomous disturbance according to claim 3, wherein a plurality of randomly-sized side-edge saw teeth are formed on an inner side surface of the spoiler.

5. The spoiler apparatus for triggering turbulence transition by autonomous disturbance according to claim 3, wherein 5 to 50 grooves are evenly provided on the vehicle in the circumferential direction.

6. The spoiler apparatus for triggering turbulence transition by autonomous disturbance according to claim 5, wherein the spoiler covers no more than half of a circumferential length of the vehicle.

7. The spoiler apparatus for triggering turbulence transition by autonomous disturbance according to claim 1, wherein an outline curve of each of the plurality of dovetail grooves is determined by:
   (1) establishing a dimensionless equation:

$y = x^n(1-x)(1+n-nx)+x$ (2) selecting a value for n from 0.3 to 0.7,
   (3) obtaining a horizontal length X1 and a vertical height Y1 of the outline curve of each of the plurality of dovetail grooves, and
   (4) calculating coordinates (X, Y) of an inner side surface curve, an outer side surface curve, or a center curve as follows:

$X = x \cdot X1$, $Y = y \cdot Y1$.

8. The spoiler apparatus for triggering turbulence transition by autonomous disturbance according to claim 7, wherein an opening width of each of the plurality of dovetail grooves is not less than 2 mm, an opening angle of each of the plurality of dovetail grooves ranges from 60 to 90 degrees, and an opening depth of each of the plurality of dovetail grooves is 0.5 to 1.0 times the opening width.

9. The spoiler apparatus for triggering turbulence transition by autonomous disturbance according to claim 1, wherein a plurality of protrusions is arranged on a surface of the spoiler at equal distance along the flow incoming direction,
   wherein two ends of each of the plurality of protrusions are larger than the middle of the protrusion, widths of the two ends are 0.1 to 0.2 times an inter-protrusion distance, two side surfaces of each of the plurality of protrusions each have a shape of circular arc, the circular arc having a central angle ranging from 30 to 60 degrees, and the inter-protrusion distance is 0.5 to 2.0 times a width of the spoiler.

10. The spoiler apparatus for triggering turbulence transition by autonomous disturbance according to claim 9, wherein an outer surface of each of the plurality of protrusions has a shape of circular arc, and a central angle of the circular arc ranges from 60 to 90 degrees.

11. A spoiler, wherein the spoiler is a flow-guiding plane structure having a continuously increasing curvature, an upstream portion of the spoiler is parallel to a flow incoming direction, and a downstream portion of the spoiler is parallel to a circumferential direction; and
   wherein a plurality of randomly-sized side-edge saw teeth are formed on an inner side surface of the spoiler.

12. The spoiler according to claim 11, wherein an inner side surface curve, an outer side surface curve, or a center curve of the spoiler is determined by:
   (1) establishing a dimensionless equation:

$y = x^n(1-x)(1+n-nx)+x$ (2) selecting a value for n from 0.3 to 0.7,
   (3) obtaining a horizontal length X0 and a vertical height Y0 of the inner side surface curve, the outer side surface curve, or the center curve of the spoiler, and
   (4) calculating coordinates (X, Y) of the inner side surface curve, the outer side surface curve, or the center curve as follows:

$X = x \cdot X0$, $Y = y \cdot Y0$.

13. The spoiler according to claim 12, wherein a limiting structure is provided at one end of the spoiler to limit a maximum opening angle and a minimum compressed height of the spoiler.

14. The spoiler according to claim 12, wherein a plurality of dovetail grooves is arranged in parallel to each other on a surface of the spoiler.

15. The spoiler according to claim 14, wherein an opening width of each of the plurality of dovetail grooves is not less than 2 mm, an opening angle of each of the plurality of dovetail grooves ranges from 60 to 90 degrees, and an opening depth of each of the plurality of dovetail grooves is 0.5 to 1.0 times the opening width.

16. The spoiler according to claim 12,
wherein a plurality of protrusions is arranged on a surface of the spoiler at equal distance along the flow incoming direction,
wherein two ends of each of the plurality of protrusions are larger than the middle of the protrusion, widths of the two ends are 0.1 to 0.2 times an inter-protrusion distance, two side surfaces of each of the plurality of protrusions each have a shape of circular arc, the circular arc having a central angle ranging from 30 to 60 degrees, and the inter-protrusion distance is 0.5 to 2.0 times a width of the spoiler.

17. The spoiler according to claim 16, wherein an outer surface of each of the plurality of protrusions has a shape of circular arc, and a central angle of the circular arc ranges from 60 to 90 degrees.

\* \* \* \* \*